US007251504B2

(12) United States Patent
Lee et al.

(10) Patent No.: US 7,251,504 B2
(45) Date of Patent: Jul. 31, 2007

(54) METHOD FOR PLAYING INTERACTIVE CONTENTS FOR STANDBY MODE IN A MOBILE COMMUNICATION TERMINAL, AND A MOBILE COMMUNICATION TERMINAL USING THE SAME

(75) Inventors: Dong-Heon Lee, Seoul (KR); Doo-Hee Jung, Kyungki-Do (KR)

(73) Assignee: Neomtel Co., Ltd., Seoul (KR)

( * ) Notice: Subject to any disclaimer, the term of this patent is extended or adjusted under 35 U.S.C. 154(b) by 213 days.

(21) Appl. No.: 10/982,200

(22) Filed: Nov. 5, 2004

(65) Prior Publication Data

US 2005/0138105 A1    Jun. 23, 2005

(30) Foreign Application Priority Data

| May 8, 2002 | (KR) | ................. | 10-2002-0025171 |
| Mar. 10, 2003 | (KR) | ................. | 10-2003-0014687 |
| May 7, 2003 | (KR) | ................. | PCT/KR03/00908 |

(51) Int. Cl.
*H04M 1/00* (2006.01)

(52) U.S. Cl. ................ 455/566; 455/552.1; 455/556.1; 455/557

(58) Field of Classification Search ................ 455/566, 455/552.1, 556.1, 557
See application file for complete search history.

(56) References Cited

FOREIGN PATENT DOCUMENTS

| EP | 0827098 A2 | 3/1998 |
| EP | 1011248 A2 | 6/2000 |
| EP | 1043905 A2 | 10/2000 |
| EP | 1098457 A1 | 5/2001 |
| JP | 1993-508759 A | 12/1993 |

(Continued)

OTHER PUBLICATIONS

Internal Search Report dated Aug. 28, 2003 re PCT Application PCT/KR03/00908.

*Primary Examiner*—Temica Beamer
(74) *Attorney, Agent, or Firm*—Graybeal Jackson Haley LLP

(57) ABSTRACT

The present invention relates to a method for playing interactive contents for standby mode in a mobile communication terminal, which allows a user of the mobile communication terminal to perform a variety of operations on a standby mode by operating a player to play interactive contents provided by mobile communication terminal makers or communication service providers on the standby mode in a user-specified standby screen and allows a direct Internet browsing to a specific URL based on a user's operation, and a mobile communication terminal using the same.

According to the method for playing interactive contents for standby mode in the mobile communication terminal and the mobile communication terminal using the same, the interactive contents can be played in the standby mode and so other pictures can be viewed in the standby mode according to a key operation by a user. Further, when a user presses a particular key while the user views an advertisement moving picture played in the standby screen mode of the mobile communication terminal, it is possible to immediately access a URL site included in the advertisement moving picture, which contributes to activation of advertisement industry using the mobile communication terminal. Furthermore, various kinds of interactive contents can be provided for the mobile communication terminal, and thus, the mobile communication terminal can be more effectively sold. In addition, the user can easily download the interactive contents for standby mode into the mobile communication terminal via a network.

22 Claims, 12 Drawing Sheets

FOREIGN PATENT DOCUMENTS

| | | |
|---|---|---|
| JP | 1996-163160 A | 6/1996 |
| JP | 2000-339255 A | 12/2000 |
| JP | 2001-511562 A | 8/2001 |
| JP | 2003-520536 A | 7/2003 |
| KR | P2001-62602 A | 7/2001 |
| KR | P2002-31775 A | 5/2002 |
| KR | P2003-8944 A | 1/2003 |
| WO | WO 02/071285 A1 | 9/2002 |

(2A)

(2B)

Key input →

(2C)

(2D)

Key input →

FIG. 7

| Action commands | Actions |
|---|---|
| BRANCH | GOTO_FRAME, LOOP |
| PLAY | START_PLAY, STOP_PLAY, PAUSE_PLAY |
| SOUND | OFF_SOUND, ON_SOUND, START_SOUND, STOP_SOUND |
| VIEW | MOVE_CAMERA_POS, CHANGE_ZOOM |
| BUTTON | GOTO_NEXT_BUTTON, GOTO_PREV_BUTTON |
| OBJECT | DISPLAY_OBJECT, EXPUNGE_OBJECT, CHANGE_COLOR |
| QUIT | QUIT, STOP_AND_GOTO_URL |
| VIBRATE | VIBRATE |

(11A)   alarm (11B)

METHOD FOR PLAYING INTERACTIVE CONTENTS FOR STANDBY MODE IN A MOBILE COMMUNICATION TERMINAL, AND A MOBILE COMMUNICATION TERMINAL USING THE SAME

Priority Claim

This application claims priority from PCT Patent Application No. PCT/KR03/00908 filed 7 May 2003, which claims priority from Korean patent application nos. 10-2002-0025171, filed 8 May 2002, and 10-2003-0014687, filed 10 Mar. 2003. The three patent applications are incorporated herein by reference.

TECHNICAL FIELD

The present invention relates to a method for playing interactive contents for standby mode in a mobile communication terminal, which allows a user of the mobile communication terminal to perform a variety of operations on a standby mode by operating a player to play interactive contents provided by mobile communication terminal makers or communication service providers on the standby mode in a user-specified standby screen and further allows a direct Internet browsing to a specific URL based on a user's operation, and a mobile communication terminal using the same.

BACKGROUND ART

FIG. 1 is a flowchart schematically illustrating an entire operation of a standby mode moving picture service in a conventional mobile communication terminal. Referring to FIG. 1, system software in the conventional mobile communication terminal displays an initial moving picture by making a system entering a standby mode (ST110) if the system is initialized or a user does not operate his terminal quite a while, determining whether moving picture contents are assigned as a standby mode screen (ST115) in standby mode, and accordingly executing the moving picture contents to be the standby mode screen (ST120) if so. Then, the assigned screen is continuously displayed until external events are issued.

In the meantime, a moving picture is composed of a plurality of frames. Accordingly, when a specific external event is issued (ST125), it is determined whether the issued event is a "next screen update" event (ST130). If so, the current screen is updated with an assigned next screen, i.e. a next frame (ST130). The aforementioned "next screen update" event will be typically implemented as a timer event of the system software. On the other hand, if the moving picture contents are not assigned as the standby mode screen, a still screen is displayed as the standby mode screen (ST135), and then, the displayed still screen also waits (ST140) until the external events are issued, as described above.

The system software of the mobile communication terminal sequentially determines whether external events other than the "next screen update" event are numeric key input (ST145), call reception (ST155), and SMS reception (ST165), controls the mobile communication terminal such that it can perform suitable operations (ST150, ST160 and ST170) corresponding to the respective events, and then, returns to the beginning of a system process and enters the standby mode (ST110) if a particular event is not present.

However, in the aforementioned conventional moving picture contents playing operation, when a next screen update event signal is inputted, a screen assigned as a next screen is selected and displayed on a mobile communication terminal. Then, when other successive next screen update event signals are input, corresponding assigned screens are selected and displayed. Thus, only a specific moving picture consisting of limited frames can be displayed. Further, unless the external events are next screen update signals, a process goes into each of tasks provided by the mobile communication terminal. In addition, whenever a key input is present, an assigned task is automatically performed. Therefore, there is a problem in that it is not appropriate to execute the interactive contents on the standby mode screen.

DISCLOSURE OF INVENTION

Accordingly, the present invention is conceived to solve the problem in the prior art. An object of the present invention is to provide a method for playing interactive contents for standby mode in a mobile communication terminal, which allows a user of the mobile communication terminal to perform a variety of operations on a standby mode by operating a player to play interactive contents provided by mobile communication terminal makers or communication service providers on the standby mode in a user-specified standby screen and allows a direct Internet browsing to a specific URL based on a user's operation, and a mobile communication terminal using the same.

BRIEF DESCRIPTION OF DRAWINGS

The above and other objects, features and advantages of the present invention will be more clearly understood from the following detailed description taken in conjunction with the accompanying drawings, in which:

FIG. 7 is a table showing an example of action commands for performing actions in accordance with a method for playing interactive contents for standby mode according to the present invention;

BEST MODE FOR CARRYING OUT THE INVENTION

Hereinafter, the present invention will be in detail described with reference to the accompanying drawings.

Figure 1:
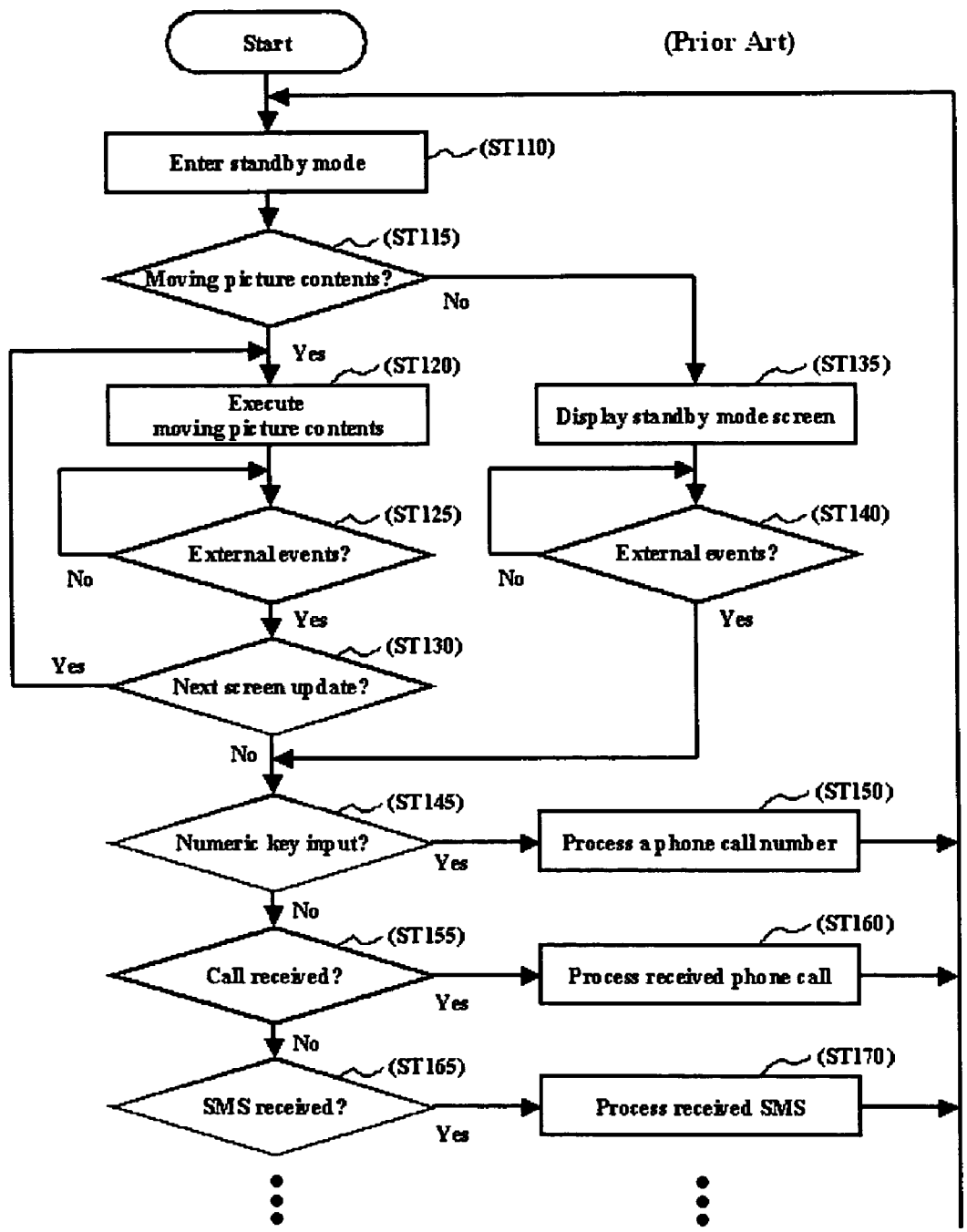
FIG. 1 is a flowchart schematically illustrating an entire operation of a standby mode moving picture service in a conventional mobile communication terminal.
Figure 2:
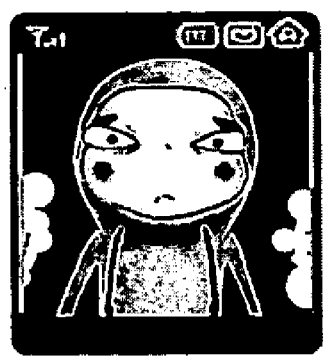
FIG. 2 is a view showing an embodiment in which interactive contents are played in a mobile communication terminal in accordance with a method for playing interactive contents for standby mode according to the present invention.
Figure 2:
Figure 2:
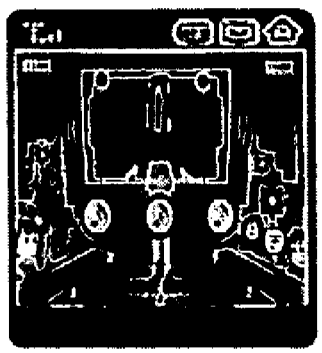
Figure 2:
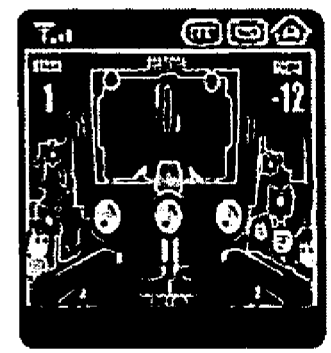

FIG. 2 is a view showing an embodiment of playing interactive contents on a mobile communication terminal in accordance with a method for playing the interactive contents for standby mode according to the present invention, wherein (A)–(B) of FIG. 2 is an example of this embodiment to provide a user with an "anger-calming service" in the mobile communication terminal for removing user's stress, using a well known Korean character, "Woobiboy," and (C)–(D) of FIG. 2 is another example of this embodiment to provide a "DDR (Dance Dance Revolution) service" to a user in the mobile communication terminal. In the present invention, ft is assumed that interactive contents illustrated in FIG. 2 are screens for standby mode of the mobile communication terminal, and that they are downloaded via a mobile communication network and stored in a memory module of the mobile communication terminal, similarly to contents of a standby mode screen in the prior art.

The "anger-calming service" shown in (A)–(B) of FIG. 2 will be first explained. In a normal standby mode, a standby screen of a normal moving picture or a still picture as shown in (A) of FIG. 2 shall be displayed. When a user presses a key particularly defined for the shown "woobiboy" contents, a display of the contents is changed as illustrated in (B) of FIG. 2. For example, (B) of FIG. 2 shows the "woobiboy" beaten through actuation of a predetermined tool when the defined key is pressed.

Next, the "DDR service" illustrated in (C)–(D) of FIG. 2 will be explained. In a normal standby mode, a normal dance standby screen as shown in (C) of FIG. 2 is displayed. When a user presses a key particularly defined for the shown interactive dance contents, e.g. a 4-way arrow key, a dancer of the contents takes an action accordingly, as illustrated in (D) of FIG. 2, and a score is marked depending on the matching of contents displayed on a screen with a key pad input of a user, similarly to a well known DDR service.

In order to enjoy the aforementioned "anger-calming service" or "DDR service", the user must manipulate one or more keypads, preferably specified particularly for interactive contents, under current action in the standby mode. Typically, a keypad of the mobile communication terminal mostly has a function to play the interactive contents. For example, the 4-way arrow key of the mobile communication terminal must be used in order to use the "DDR service" illustrated in (C)–(D) of FIG. 2. The 4-way arrow key is assigned with corresponding functions such as "message management" and "telephone number book" menus in the standby mode. Accordingly, it is considered to be more preferable in the present invention that, when a particular interactive mode activation key input, e.g. a key input to press a "cancellation" button long, is generated on the standby mode screen, accordingly the interactive contents for standby mode enter an activation state in which a user enjoy the above-mentioned "anger-calming service" and "DDR service". But, the present invention does not exclude an implementation of the "anger-calming service" or "DDR service" by means of a key input not used in the standby mode state. In addition, it is assumed that the interactive contents for standby mode of the present invention are multimedia files including audio data as well as video data.

The interactive contents and the services using the same according to the present invention can be realized in various forms without departing from the scope and spirit of the present invention, in addition to the two above-mentioned examples. Preferably, a moving picture advertisement can be effectively performed by using these interactive contents and services. For example, if particular URL (Uniform Resource Locator) information is included in the interactive contents, an operation of advertisement similar to a banner advertisement being currently performing on computers can be performed on the standby mode screen of the mobile communication terminal. In other words, when a particular key of the mobile communication terminal is inputted while an interactive moving picture provided from the mobile communication terminal is viewed, an access to a URL linked to the moving picture is made.

This means interactive advertisement contents to be connected to a site by using one key, as another embodiment to use a method of playing interactive contents according to the present invention. A user downloads interactive contents for free from a particular site and assigns them as standby screen contents. Such interactive contents include codes to allow a direct access to a particular site when a user presses a particular key. Accordingly, when the user presses the particular key while the interactive contents are being played in a standby screen, a controller module of an interactive contents player or a mobile communication terminal determines whether a site access function is activated according to the key input, and then when it is determined for the site access function to be activated, the playing of the interactive contents is aborted and the site is accessed by transmitting a URL of the site to a wireless Internet browser through an interactive manager which will be described later. When the user returns to the standby screen after finishing required works at the site, the interactive contents player is again driven to show assigned interactive contents.

Figure 3:
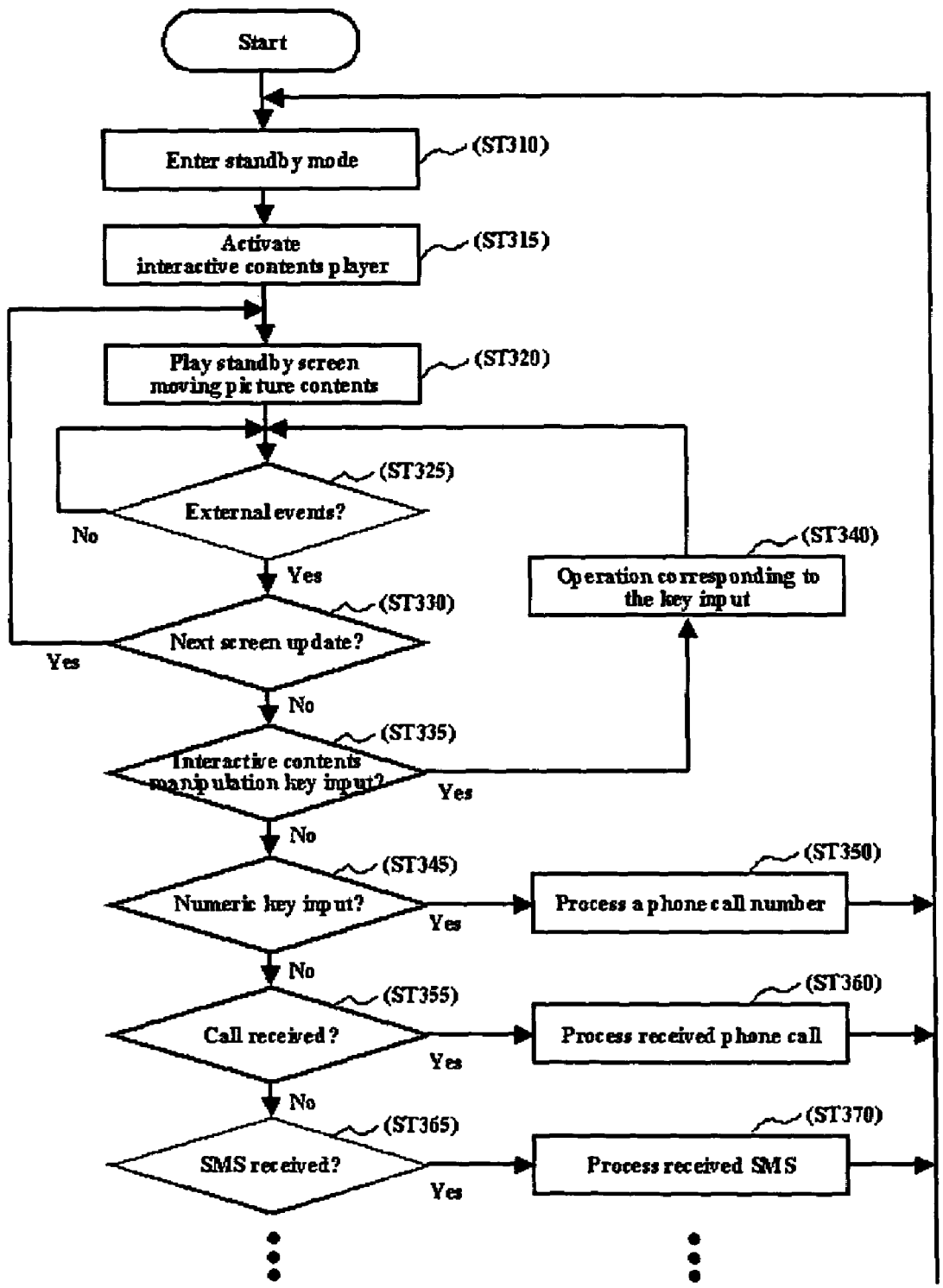
FIG. 3 is a flowchart schematically illustrating an operation of playing interactive contents for standby mode in the mobile communication terminal according to the present invention.

FIG. 3 is a flowchart for explaining briefly a play operation of interactive contents for standby mode in the mobile communication terminal according to the present invention. Referring to FIG. 3, if a system of the mobile communication terminal of the present invention is initialized or a user does not operate his terminal quite a while, the mobile communication terminal becomes to enter a standby mode (ST310) and to activate the interactive contents player of the present invention (ST315), and then becomes to play interactive contents, which is assigned as standby screen moving picture contents, to be displayed on a terminal screen (ST320). Then, the assigned screen is continuously displayed until external events are issued. Since the interactive contents for standby mode according to the present invention include a plurality of frames, when the external events are issued (ST325), it is determined whether the issued events are "next screen update" (ST330). If so, the assigned screen is updated with a next frame (ST320).

On the other hand, if it is determined that the issued events are not "next screen update", ft is determined whether the issued events are interactive contents manipulation key input set for interactive contents being displayed as current standby screen moving picture on the terminal screen (ST335). If so, a series of operations defined to be performed corresponding to the key input are performed (ST340) and then next events are wafted. On the other hand, if it is determined that the issued events are not interactive contents manipulation key input, the issued events are sequentially parsed among a numerical key input (ST345), a call reception (ST355), and a SMS reception (ST365), and the mobile communication terminal is controlled such that it can perform adaptable operations (ST350, ST360 and ST370) corresponding to the respective events. And then, the mobile communication terminal returns to the beginning of system process and enters the standby mode (ST310) if a particular event is not present.

Figure 4:
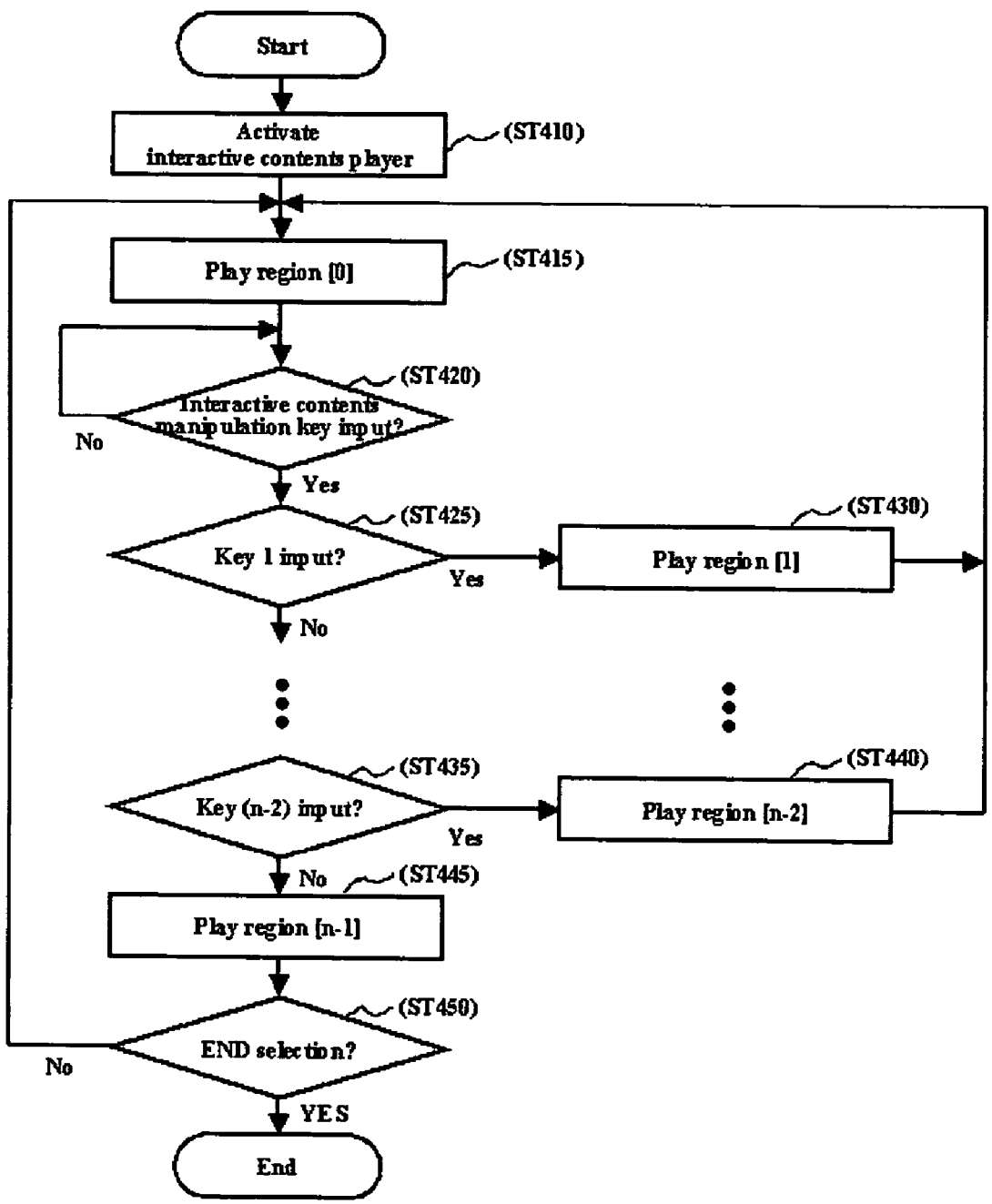
FIG. 4 is a flowchart illustrating an embodiment in which interactive contents are separately played in accordance with a method for playing interactive contents for standby mode according to the present invention.

FIG. 4 is a flowchart for explaining an embodiment of playing interactive contents distinguishably in a method for playing interactive contents for standby mode according to the present invention. The interactive contents data according to the present invention is configured differently from the moving picture of the prior art. The entire operation for interactive contents according to the present invention is divided into n regions. When the mobile communication terminal enters the standby mode and the interactive contents player is activated (ST410), then region [0], i.e. an initial region, is played and a key input from a user is wafted. The operation of the mobile communication terminal while waiting for the key input from the user can be implemented in various ways. For example, the mobile communication terminal may display the still picture at the last frame of the region [0], or may display a predetermined moving picture, or may repeat a procedure of playing the region [0] if the key input is not provided from the user for a preset time.

In the interactive contents according to the present invention, interactive contents manipulation keys are particularly defined for each of interactive contents. When the mobile communication terminal is provided a key input during playing the interactive contents, it preferably checks whether the key input is included in the interactive contents manipulation keys particularly defined for the interactive contents (ST420). And then, the mobile communication terminal provides a service only for the particularly defined key input, while remaining key inputs are disregarded. However, for such control key as power on/off, volume up/down, or interactive mode termination, the mobile communication terminal preferably provides corresponding services at all times.

When a key input i defined as interactive contents manipulation key is provided, the input key i is parsed (ST425, ST435) and then the corresponding region [i] is played (ST430, ST440, ST445). Then, for key inputs other than particularly defined as termination keys, a process returns to an initial step (ST415) to play the initial region [0] and a key input of the interactive contents manipulation key is wafted. On the other hand, for the key input particularly defined as the termination keys, the mobile communication terminal wafts for a user selection after the last region, i.e. region [n−1], of the contents is played (ST445). At this time, if the user provides a selection, i.e. a key input that corresponds to END, the play operation of the interactive contents according to the present invention is aborted. On the contrary, if the user provides a selection other than the END key, e.g. a key that corresponds to REPLAY, the process returns to the initial step (ST415) and plays the initial region [0] (ST425), and then an input of the interactive contents manipulation key is wafted. For example, in the "anger-calming service" and "DDR service" as illustrated in (A)–(D) of FIG. 2, the standby screen of the moving or still picture as illustrated in (A) and (C) of FIG. 2 corresponds to the region [0] and the standby screen of the moving or still picture as illustrated in (B) and (D) of FIG. 2, displayed when the interactive contents manipulation key i is provided, which corresponds to the region [i].

However, in this embodiment, an operation to branch into END or REPLAY based on a selection of the user is described only as an example in the present invention. Attentively, ft is possible to implement such that the play operation of the interactive contents according to the present invention is aborted immediately after the last region, i.e. region [n−1], is played (ST445), when a key input defined as the termination key is provided. is In addition, although this embodiment shows that one interactive contents manipulation key corresponds to one play region, it is also possible to implement such that a plurality of interactive contents manipulation keys may correspond to one play region. Further, although only one "termination key" is shown in the embodiment described above with respect to FIG. 4, it is also possible to implement such that a plurality of termination keys may be defined.

Furthermore, although this embodiment suggests that the interactive contents manipulation key is only for playing a particular region [i] of the interactive contents, it should be understood that the interactive contents player is for performing the so-called "action" in various forms and the action is not limited to the playing operation. The playing of the region [i] in the embodiment is merely one example of the action. However, for the interactive contents manipulation keys other than those for playing the particular region [i], corresponding interactive actions are to be performed according to this invention, which are not shown in FIG. 4.

Figure 5:
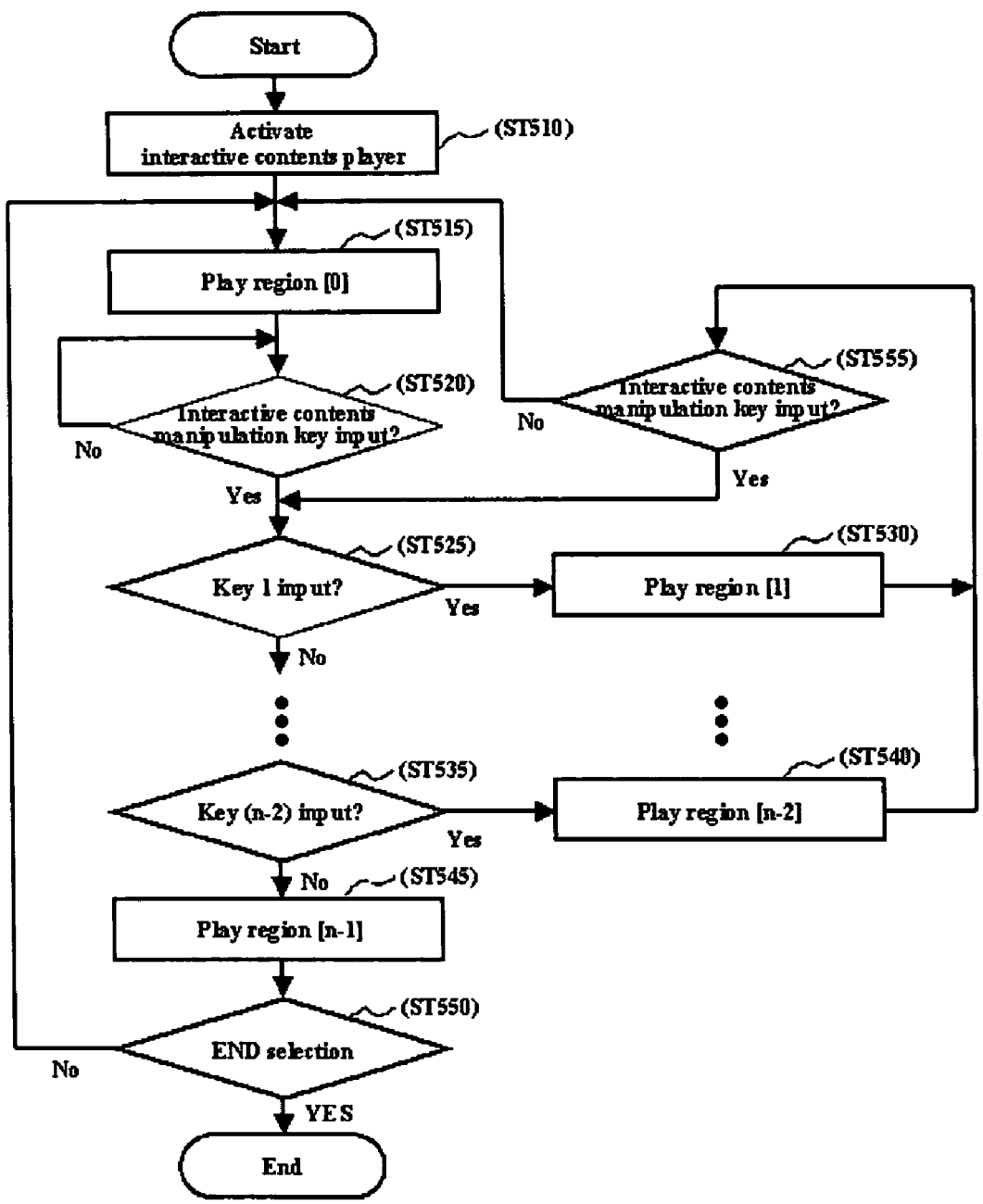
FIG. 5 is a flowchart illustrating another embodiment in which interactive contents are separately played in accordance with a method for playing interactive contents for standby mode according to the present invention.

FIG. 5 is a flowchart for explaining another embodiment of playing interactive contents distinguishably in a method for playing interactive contents for standby mode according to the present invention. The embodiment of FIG. 5 is generally similar to that of FIG. 4 except for the following description.

In the embodiment of FIG. 5, it is checked (ST555) whether another interactive contents manipulation key j is inputted immediately after the region [i] is played (ST530, ST540) when one interactive contents manipulation key i is inputted (ST525, ST535) in order to allow a so-called "continuous action". If inputted, the key input j is immediately parsed (ST525, ST535) to play a corresponding region [j] without playing the initial region [0]. Otherwise, the initial region [0] is played and then an input of an interactive contents manipulation key is wafted, as similar to the embodiment of FIG. 4. For example, in the "anger-calming service" and "DDR service" as illustrated in (A)–(D) of FIG. 2, this embodiment makes it possible to provide a service with a continuous operation without displaying contents of the initial region, i.e. region [0] on the screen when key inputs by user are continuously provided.

Figure 6:
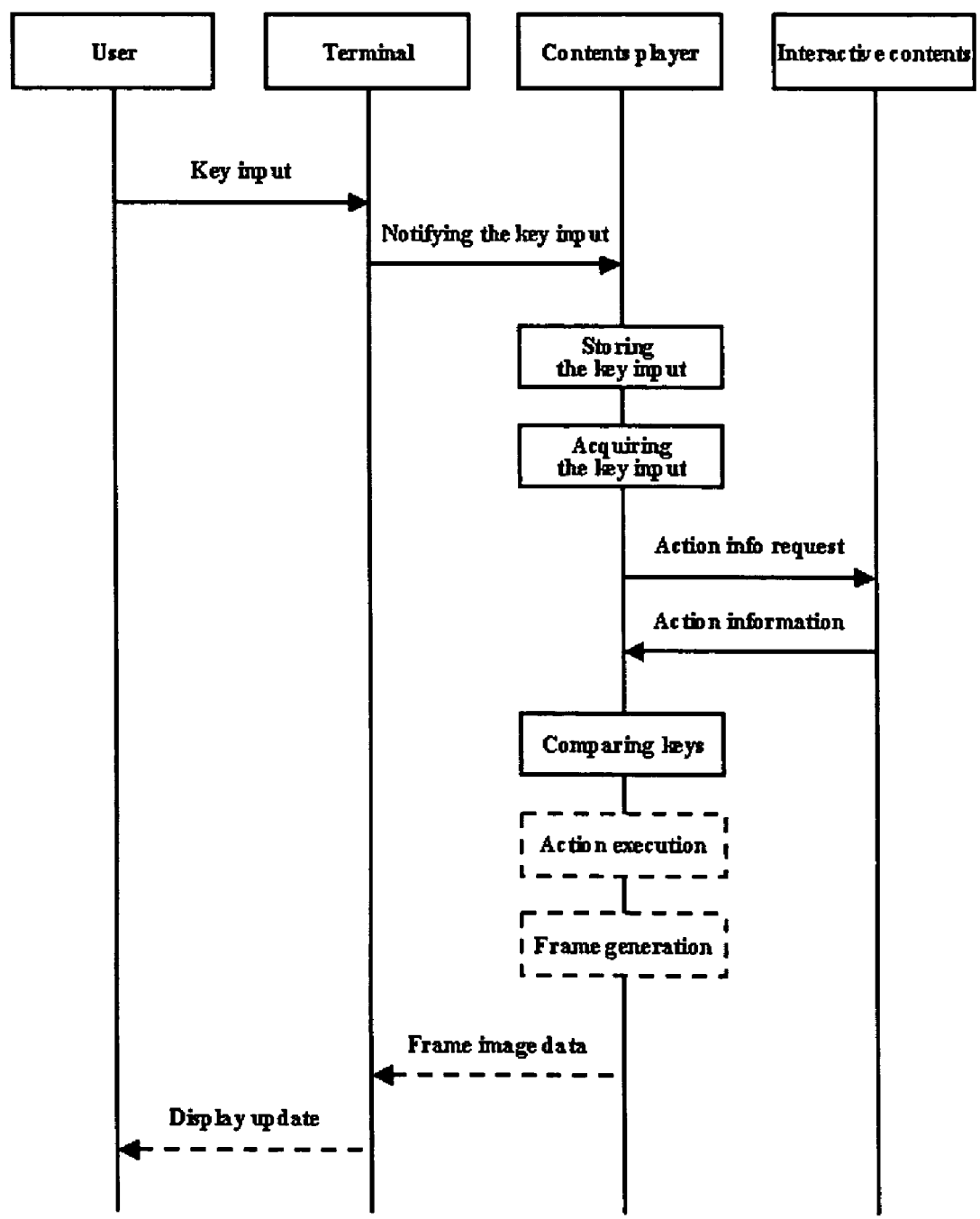
FIG. 6 is a view schematically showing a process generated for performing and displaying an action according to a key input action by a user in accordance with a method for playing interactive contents for standby mode according to the present invention.

FIG. 6 is a schematic view showing a process generated for performing and displaying an action according to a key input from a user in a method for playing interactive contents for standby mode according to the present invention. First, when a user inputs the above-mentioned interactive contents manipulation key using a keypad of the mobile communication terminal, a system program of the mobile communication terminal checks the key input and informs the interactive contents player of the key input using a preset internal function. Then, the interactive contents player sends the key input to a key input queue in order to provide a smooth service for the informed key input.

The interactive contents player of the present invention preferably determines the presence of action to be taken in each frame of the interactive contents whenever one frame is played. For this purpose, the key input queue is first received to obtain the informed key input, and action information on a current frame is obtained from the interactive contents in order to provide a service for the key input, and then it is determined whether an action corresponding to the key input is present or not. If present, the corresponding action is performed to generate a corresponding frame, and then frame image data are transmitted to the system software of the mobile communication terminal in order to update a display. Otherwise, the key input can be disregarded, and, in FIG. 6, "action performance", "frame generation", "frame image data", and "display update" are indicated using dotted lines.

FIG. 7 is a table showing an example of action commands for performing actions in a method for playing interactive contents for standby mode according to the present invention. The action commands as listed in FIG. 7 are used to concretely represent the actions to be performed by the interactive contents player, which actions correspond to interactive contents manipulation key by a user for the interactive contents according to the present invention. The action information provided by the interactive contents in the embodiment of FIG. 6 is represented by using these action commands.

FIG. 7 shows an embodiment of these action commands, which are divided into a branch command, a play command, a sound command, a view command, a button command, an object command, a quit command, and a vibrate command, each representing various kinds of the actions. First, the branch command includes GOTO_FRAME command representing a movement to a particular frame; and LOOP command representing a repetitive performance by a preset loop count between first and second frames. The play command includes START_PLAY command representing a play of interactive contents starting with a current frame; STOP_PLAY representing a stop of play of interactive contents and a movement to an initial frame, i.e. frame 0; and PAUSE_PLAY command representing a stop of play of interactive contents and a standby at the current frame.

In addition, the sound command includes OFF_SOUND command representing a mute of all sound played currently; ON_SOUND command representing a return of all sound played currently to a volume prior to the mute; and START_SOUND command representing a stop of play of a particular sound. The view command includes MOVE_CAMERA_POS command representing a movement of position of a camera view; and CHANGE_ZOOM command representing a change of zoon factor of the camera view. In addition, the button command includes GOTO_NEXT_BUTTON command representing a movement of a focus to a next button; and GOTO_PREV_BUTTON command representing a movement of the focus to a previous button. The object command includes DISPLAY_OBJECT command representing a positioning of a particular object on a display panel; EXPUNGE_OBJECT command representing an expunging of a particular object from a frame; and CHANGE_COLOE command representing a color operation on a particular object. In addition, the quit command includes QUIT command representing an end of the interactive contents player, and STOP_AND_GOTO_URL command representing a return to a particular URL while the interactive contents player is ended. The vibrate command includes VIBRATE command representing a vibration of the mobile communication terminal for a preset time.

A time at which an assigned action is to be performed can be limited for these action commands. For example, the assigned action can be performed when a current frame starts, or when a current frame ends, or anytime. For example, the GOTO_FRAME command is adaptable to be performed when the current frame ends, the START_PLAY command is adaptable to be performed when the current frame starts, or the STOP_PLAY command may be performed anytime.

Figure 8:
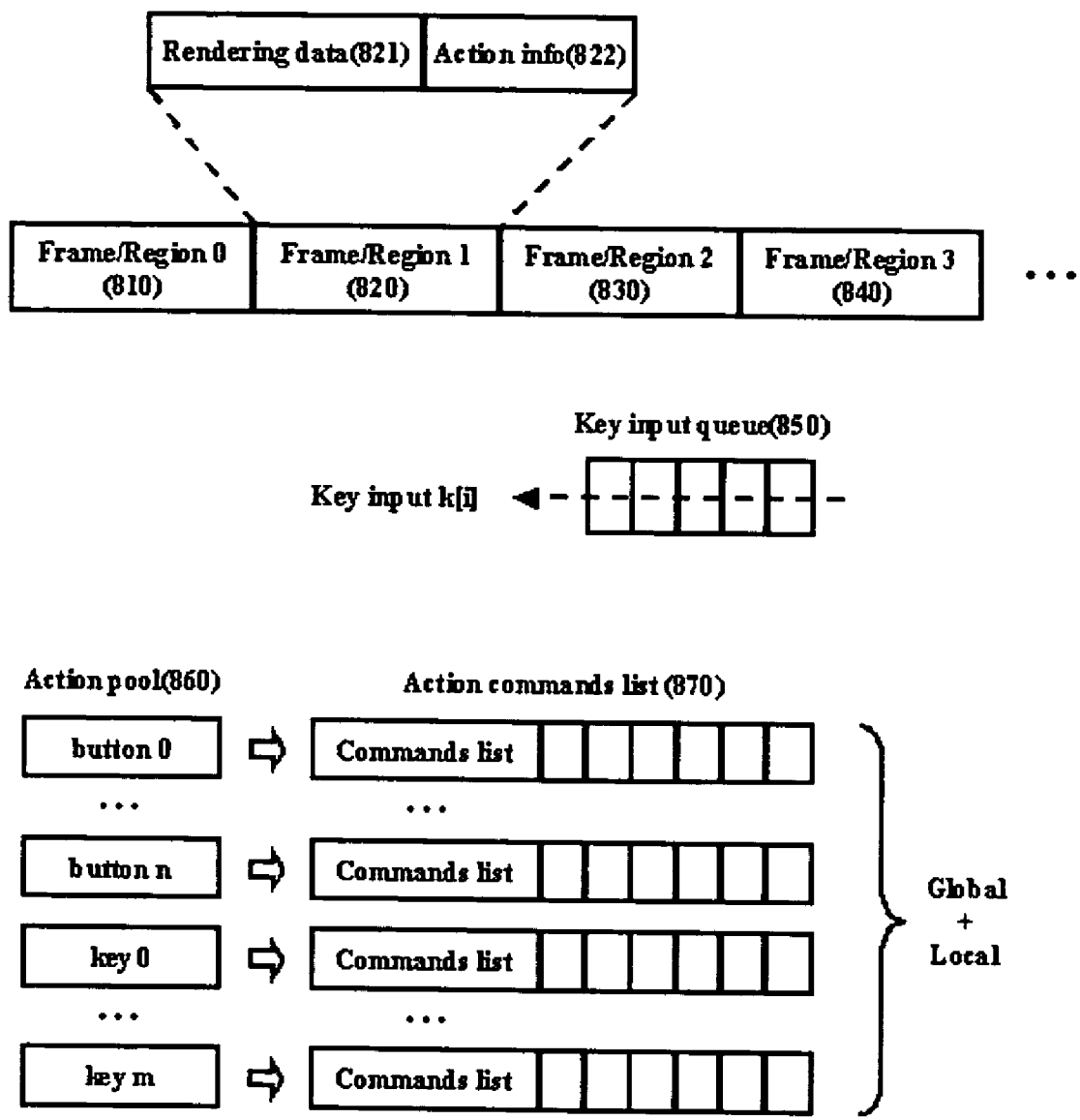
FIG. 8 is a diagram showing a design concept of a decoder used in a player of the mobile communication terminal for performing the method for playing interactive contents for standby mode according to the present invention.

FIG. 8 is a diagram showing a design concept of a decoder in a player of the mobile communication terminal performing a method for playing interactive contents for standby mode according to the present invention. The interactive contents for standby mode according to the present invention, which is a kind of moving picture consisting of a plurality of frames, includes frame data 810, 820, 830, 830 for each frame as shown in FIG. 8. Each one 820 of the frame data includes rendering data 821 and action information 822. The interactive contents player of the present invention displays contents of frame on a display screen of the mobile communication terminal based on the rendering data 821, and performs an interactive operation according to the present invention based on the action information 822. However, this is to be understood not to be indispensable in the method for playing interactive contents for standby mode according to the present invention. That is, other than being distinguished by a frame, ft is possible to include the rendering data 821 and the action information 822 in the unit of the play region described above with reference to FIGS. 4 and 5, for example.

While the mobile communication terminal performs the interactive operation according to the present invention, the key input provided by a user is preferably sent to a key input queue 850, and then is transmitted to the interactive contents player through the receiving operation of the key input queue 850 when the interactive contents player processes the key input. The interactive contents player of the present invention searches an action pool 860 in order to perform the interactive operation according to the present invention for a key input k[i]. Here, the action pool 860 means a list of user input events to provide interactive services for frames or regions being currently played. Key inputs or button selections can be typical examples for these user input events. The action information 822 of the particular interactive contents includes the kinds of user input events to perform the interactive services and the corresponding action commands list 870. In addition, the action commands list 870 is a list of action to be performed by the interactive contents player for the user input events, and can include one or more action commands as shown in FIG. 8. These action commands are shown, as an example, in FIG. 7.

Among the above-mentioned user input events, a "button selection" means an event particularly defined as a "button" for the interactive contents being played. For example, for the "DDR service" illustrated in (C)–(D) of FIG. 2, a user must perform one of several limited key inputs corresponding to an indication such as an arrow indicated on the display screen of the mobile communication terminal, which is referred to as a "button selection" for the "DDR service" interactive contents. Therefore, the "button selection" is closely associated with the interactive contents being currently played. The interactive contents player of the present invention first interprets a key input from a user as a button selection, obtains the action commands list 870 corresponding to the button selection, and then performs one or more action commands included in the action commands list 870 to provide interactive services.

On the contrary, among the above-mentioned user input events, a "key input" other than the "button selection" means an event other than particularly defined as a "button" for the interactive contents being played. For example, the "key input" includes an audio mute, an environment setup, or a key input for striking a anger-calming target character in the case of the "anger-calming service" illustrated in (A)–(B) of FIG. 2. Therefore, the "key input" can be also closely associated with the interactive contents being currently played. The interactive contents player of the present invention first obtains the action commands list 870 corresponding to the key input and then performs one or more action commands included in the action commands list 870 to provide interactive services.

A combination of the above-mentioned action pool 860 and action commands list 870 can be preferably divided into a "global action" and a "local action", where the former is applied independent of the frames or the regions being currently played, and the latter is applied limitedly to frame or regions being currently played. For example, for the "DDR service", a key input corresponding to an arrow indication and a corresponding action command corresponds to the "local action", and a key input such as an environment setup or an audio mute and a corresponding action command corresponds to the "global action". The information on the local action is preferably included in the action information 822 of the is frame or region 820, while the information on the global action is preferably included in a separate field (not shown) other than that for frame or region data.

Figure 9:
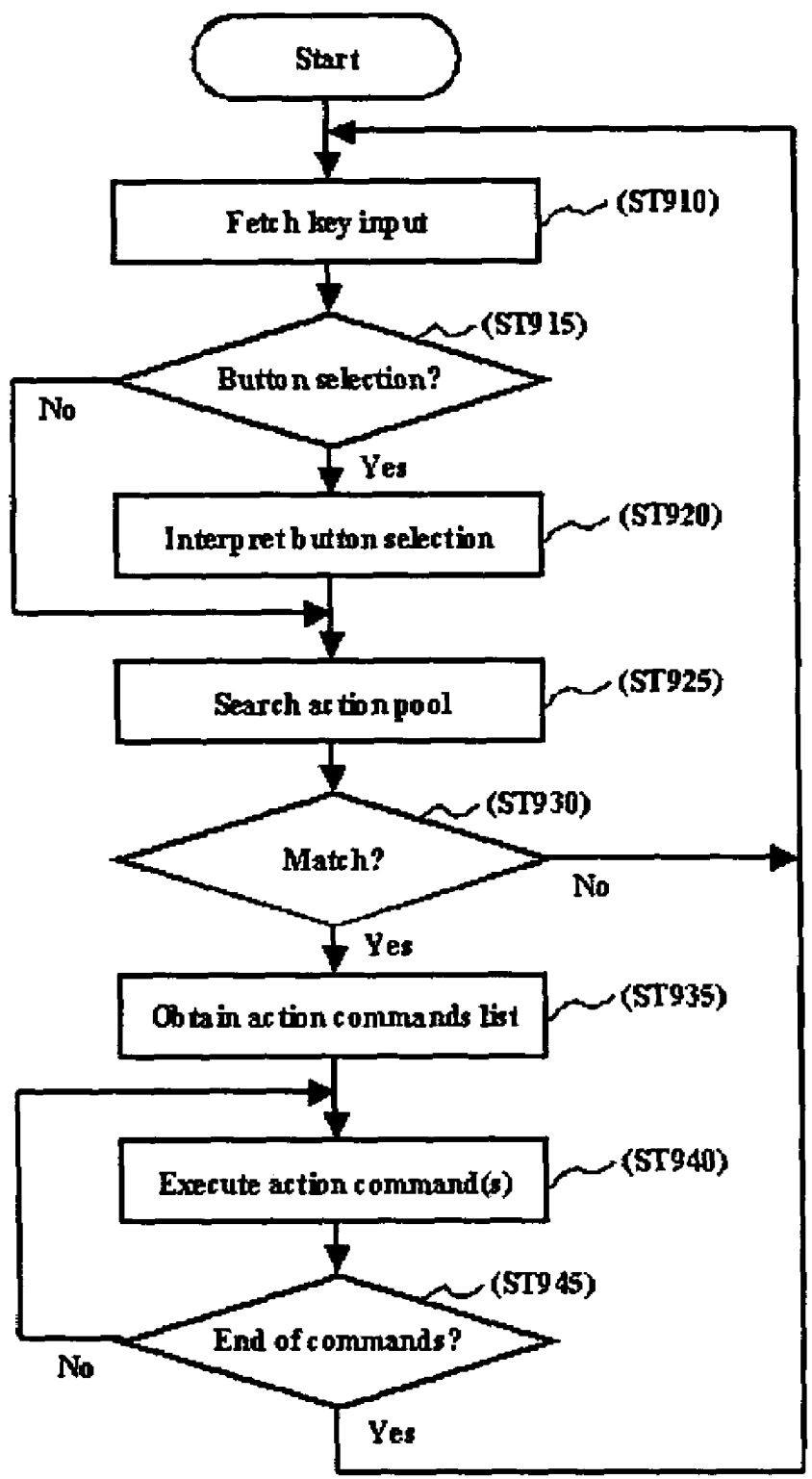
FIG. 9 is a flowchart conceptually illustrating an interactive service operation of a player of the mobile communication terminal for performing the method for playing interactive contents for standby mode according to the present invention.

FIG. 9 is a conceptual diagram of an interactive service operation within a player of the mobile communication terminal performing a method for playing interactive contents for standby mode according to the present invention. Referring to FIG. 9, when an external key input is provided while the interactive contents for standby mode are played, the interactive contents player of the present invention first fetches the provided key input [k] (ST910) and then determines whether the key input [i] corresponds to the "button selection" (ST915). If so, the key input k[i] is interpreted as a corresponding button selection, but if not so, the key input is used as it is. Then, the action pool 860 described for the "button selection" or the "key input" is searched (ST925). If a match is not found, the "button selection" or the "key input" is disregarded. If a match is found, a corresponding action commands list 870 is obtained (ST935) and then one or more action commands included in the action commands list 870 are executed (ST940 and ST945) to provide the interactive contents service according to the present invention corresponding to the external key input. Then, the process returns to an initial step and a key input is waited.

Figure 10:
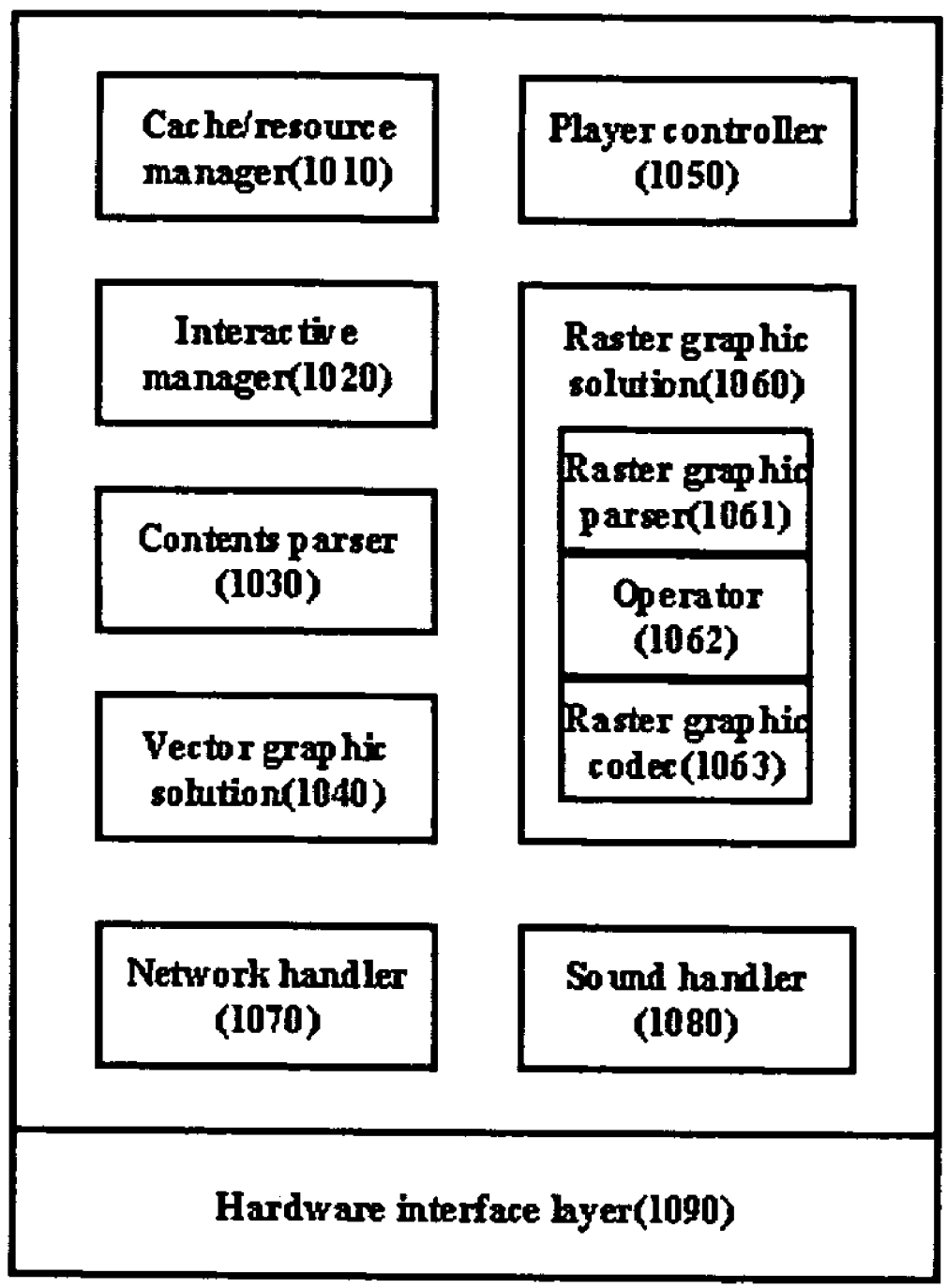
FIG. 10 is a diagram conceptually showing a configuration of an interactive contents player of the mobile communication terminal for performing the method for playing is interactive contents for standby mode according to the present invention.

FIG. 10 is a conceptual diagram of a configuration of an interactive contents player 1000 of the mobile communication terminal performing a method for playing interactive contents for standby mode according to the present invention. As shown in the figure, the interactive contents player 1000 of the present invention includes a cache/resource manager 1010, an interactive manager 1020, a contents parser 1030, a vector graphic solution 1040, a player controller 1050, a raster graphic solution 1060, a network handler 1070, a sound handler 1080, and a hardware interface layer 1090. The interactive contents player 1000 can be implemented as software on a memory of the mobile communication terminal performing the method for playing the interactive contents according to the present invention or as a separate hardware.

Referring to FIG. 10, first, the hardware interface layer 1090 functions as an interface for solving problems of hardware and application software applied differently for each mobile communication terminal. This is because separation of an abstract portion used in common in the mobile communication terminal and a portion dependent on the hardware allows an effective installation of software in the mobile communication terminal with smooth correspondence to a variety of hardware environments.

In addition, the sound handler 1080 performs a sound process according to the interactive contents in the mobile communication terminal of the present invention. The network handler 1070 performs a wireless data communication according to the interactive contents in the mobile communication terminal of the present invention. The raster graphic solution 1060 is a graphic module for processing image data of a raster graphic format such as a BMP or a JPG. The vector graphic solution 1040 is a graphic module for processing image data of a vector graphic format.

In addition, the contents parser 1030 interprets and processes commands of the interactive contents. The player controller 1050 is a controller module of the interactive contents player for performing process of events, particularly, such as an external key input and a timer. The interactive manager 1020 processes interactive objects provided according to a kind of mobile communication terminal, or information such as time or battery state. The cache/resource manager 1010 performs management of system resources including caches and memories so that the interactive contents player 1000 can be efficiently operated in a limited environment of mobile communication terminal. The cache/resource manager 1010 is for efficiently managing a limited hardware resource of the mobile communication terminal, but is not an indispensable element of the interactive contents player 1000 of the present invention.

A format of image played in the interactive contents player can be generally divided into a raster graphic for representing an image according to information on each pixel configuring the image and a vector graphic for representing an image according to information on lines and sides. The raster graphic requires much data since the image is formed using a value of graphic information on each pixel configuring the image, while the vector graphic requires less data of image since the information on lines and sides is inputted using a mathematical equation. In addition, in the case of the interactive contents using the raster graphic, the player controller 1050 decides and plays sequentially a next image to be displayed corresponding to a keypad input event from a user and a timer event such that the interactive contents are operated in response to a manipulation by a user, while, in the case of the interactive contents using the vector graphic, a specific displacement value from a standard image according to a keypad input from a user is determined and then a next image is modified and displayed.

The interactive contents player 1000 has the raster graphic solution 1060 for processing the raster graphic. The raster graphic solution 1060 includes a raster graphic codec 1063 for processing image data transmitted in a compressed format, an operator 1062 for performing various operations such as movement, enlargement and reduction of object images within the raster graphic, and a raster graphic parser 1061 for interpreting and processing commands according to a preset raster graphic format. In addition, the interactive contents player 1000 has the vector graphic solution 1040 for processing the vector graphic. Using the vector graphic solution 1040, a displacement value is processed and the image is processed.

On the other hand, the interactive contents player 1000 according one embodiment of the present invention can be implemented to process only the vector graphic. In this case, the raster graphic solution 1060 is not required. In contrast, the interactive contents player 1000 according another embodiment of the present invention can be implemented to process only the raster graphic. In this case, the vector graphic solution 1040 is not required. However, in order to process the rendering data 821 included in the interactive contents of the present invention and display the processed data on the display screen of the mobile communication terminal, at least one graphic solution should be included.

A moving data format adaptable to be implemented in the mobile communication terminal in constructing the interactive contents used in the present invention is disclosed in Korean Patent Application NO. 10-2000-0079982 (owned by the present applicant, entitled "Moving Picture Transmitting/Receiving System and Transmitting Method Using a Wireless Communication", filed on Dec. 22, 2000, published on Jul. 7, 2001 as Korean Patent Laid-Open No. 2001-62602). The moving data format disclosed in this patent is currently under services by the name of SIS3 (Simple Image Service 3). However, the method for playing interactive contents for standby mode according to the present invention is not limited to the SIS3 data format disclosed in the above patent, but can be implemented using various formats.

In addition, although the interactive contents player 1000 of the present invention was described with reference to FIG. 10, it should be understood to include all basic components for performing normal operation of the mobile communication terminal, e.g. a processor module, a memory module, a display module, a keypad module, an antenna module, a battery module, etc.

As described with reference to FIG. 2, when the interactive contents for standby mode of the present invention are played as the standby screen, a key input provided by a user during the standby mode has to be processed. The mobile communication terminal must determine whether this key input corresponds to a normal telephone use, i.e. a search for a telephone number stored in the telephone or an input of a number key for calling, or is for the interactive contents service according to the present invention. This determination can be performed in various ways. Using one of them, an applicable embodiment will be described below.

A first process scheme is to assign a particular key with the intention of controlling the interactive contents for standby mode. For example, when the interactive contents for standby mode according to the present invention are being played in the standby screen of the mobile communication terminal, right and left movement control keys of 4-way arrow keys are used for the interactive contents service of the present invention, and remaining keys are used for a normal function of the mobile communication terminal. A second process scheme is to set a particular key input to a mode switching key input such that an interactive play mode and a normal mobile communication terminal use mode are switched. This scheme can be achieved by including flags in a memory and changing a state of a corresponding flag depending on whether the mode switching key is pressed or not by a user. The two process schemes described above can be easily implemented by simple software, but it is to be understood that other various schemes also can be employed.

Hereinafter, the first process scheme will be in more detail described with reference to the flowchart of FIG. 4. When the mobile communication terminal enters the standby mode and the interactive contents player is driven (ST410), a key input from a user is waited after the initial region [0] of the interactive contents is played. At this time, when the user provides the mode switching key input, the mobile communication terminal is switched into the interactive play mode and an interactive mode start region is preferably played in the interactive contents and displayed on the display screen so that the user can see such a switching. The interactive mode start region can be identical to one region [i] of a plurality of regions comprising the interactive contents, or can be a unique play region other than the plurality of regions.

On the other hand, the interactive contents of the present invention can be previously stored in the mobile communication terminal during a making process by a mobile communication terminal maker, or can be downloaded through a wireless Internet. In addition, the interactive contents can be first downloaded into a personal computer (PC) through a wired Internet network connected to the PC and then can be transmitted from the PC to the mobile communication terminal by means of a communication between the PC and the mobile communication terminal. In addition, preferably, a plurality of interactive contents are downloaded into the mobile communication terminal and one among them can be selected.

Figure 11:
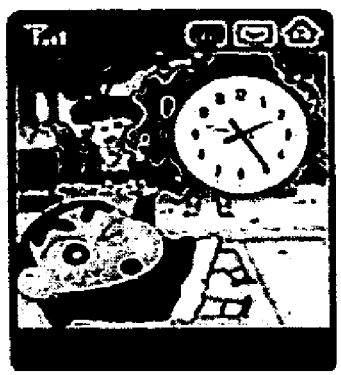
FIG. 11 is a view showing another embodiment in which interactive contents including clock and alarm contents are played on a mobile communication terminal in accordance with a method for playing the interactive contents for standby mode according to the present invention.
Figure 11:
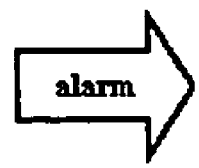
Figure 11:

FIG. 11 is a view showing another embodiment of playing interactive contents including clock and alarm contents on a mobile communication terminal in a method for playing interactive contents for standby mode according to the present invention. The embodiment illustrated in (A)–(B) of FIG. 11 provides a "clock and alarm service" on the mobile communication terminal using a "zzanggu", which is a well-known character in Korean. In a normal standby mode, a clock is displayed as a standby screen of a normal moving or still picture as shown in (A) of FIG. 11. When a user sets an alarm time by manipulating a key defined particularly for the "alarm service" in the illustrated "zzanggu" clock contents, a moving or still picture for alarm as shown in (B) of FIG. 11 is displayed on the screen of the mobile communication terminal when the set alarm time arrives and, at the same time, a preset melody is preferably played.

Figure 12:
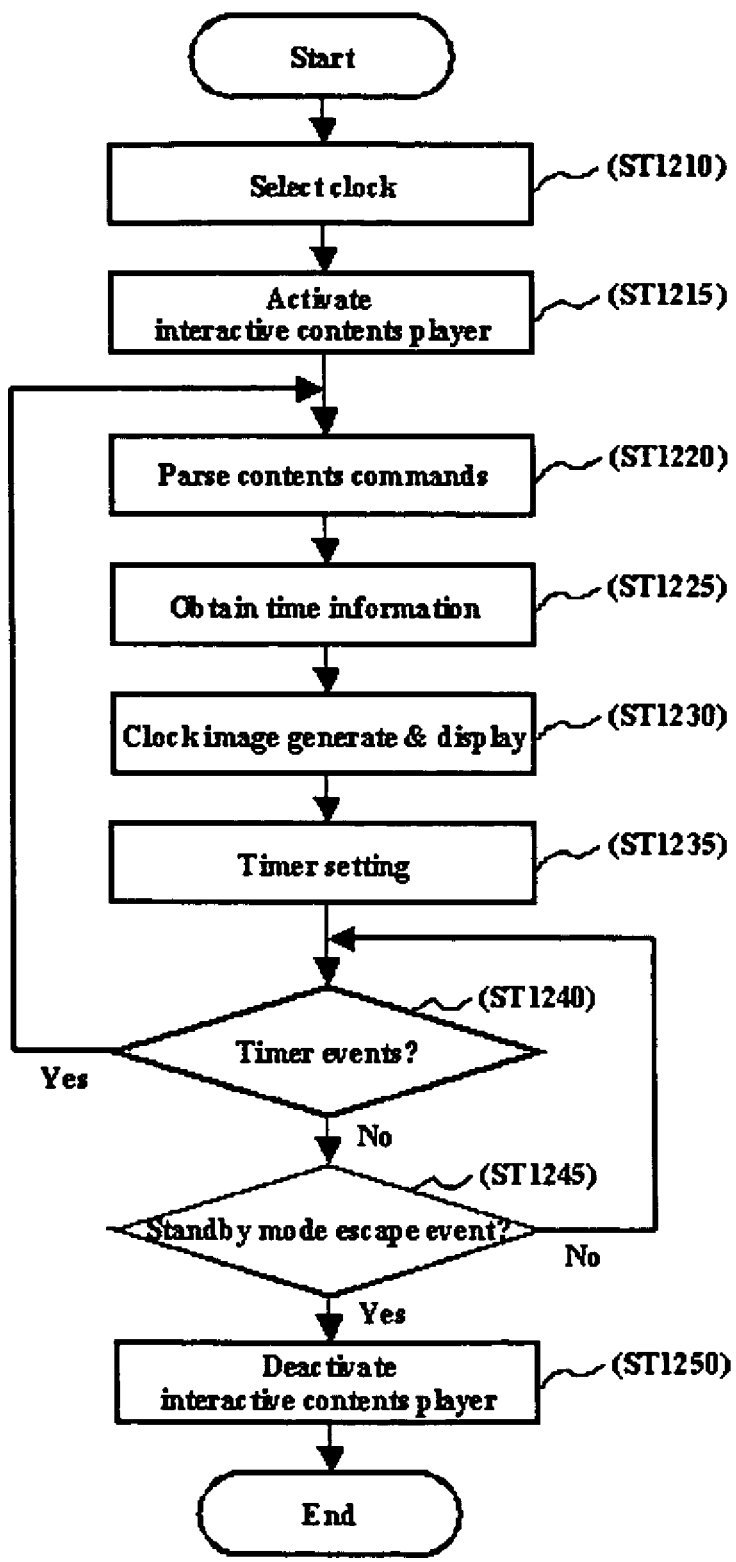
FIG. 12 is a flowchart schematically illustrating a play operation of the dock and alarm contents of FIG. 11 as examples of interactive contents for standby mode in the mobile communication terminal according to the present invention.

FIG. 12 is a flowchart for explaining briefly a play operation of the clock and alarm contents of FIG. 11 as interactive contents for standby mode in the mobile communication terminal according to the present invention. Referring to FIG. 12, considering a procedure where the interactive contents player processes the clock and alarm contents after an initial process of the mobile communication terminal is ended, when a user selects an analog dock being the interactive contents of the present invention as the standby mode screen (ST1210), the interactive contents player is first activated (ST1215) and then commands of concerned interactive contents are parsed (ST1220) using the above-mentioned contents parser 1030.

In the case of the interactive contents representing the clock, time information must be obtained from the system. Preferably, the above-mentioned interactive manager 1020 obtains time information hold by the mobile communication terminal (ST1225) and the vector graphic solution 1040 forms an analog dock image in which current time is displayed using the analog dock contents selected by the user and the obtained time information. If a background image of the dock is formed as a raster graphic, it is processed by the raster graphic solution 1060, and the hands of the clock are preferably processed as a vector graphic by the vector graphic solution 1040.

The clock image formed by the vector graphic 1040 is displayed on the display screen of the mobile communication terminal via the hardware interface layer 1090 (ST1230). The player controller 1050 sets a timer such that a timer event is issued for an update to a next screen after preset time elapses (ST1235). When the timer event is issued (ST1240), the player controller 1050 again interprets commands of the interactive contents selected currently using the contents parser 1030 (ST1220). Next, the procedure of obtaining the above-mentioned time information and displaying the clock image (ST1230) is repeated similarly.

A series of procedure described above escapes from the standby mode when a standby mode escape event such as an end key input or a telephone key input is generated (ST1245), and then the operation of the interactive contents player 1000 is deactivated (ST1250). Subsequently, a service corresponding to the issued standby escape event is performed. If an event is not issued during preset time, the system will enter the standby mode again and the above-mentioned clock image according to the interactive contents will be displayed.

As described above, according to the method for playing interactive contents for standby mode in the mobile communication terminal, and the mobile communication terminal using the same, the interactive contents can be played in the mobile communication terminal without separate key inputs and, particularly, the interactive contents can be played in the standby mode and so other pictures can be viewed in the standby mode according to a key operation by a user.

Further, when a user presses a particular key while he views an advertisement moving picture played in the standby screen mode of the mobile communication terminal, it is possible to immediately access a URL site included in the advertisement moving picture, which contributes to an activation of advertisement industry in the mobile communication terminal.

Furthermore, various kinds of interactive contents can be provided for the mobile communication terminal, which is more effective in sale of the mobile communication terminal. Also, a user can easily download the interactive contents for standby mode into the mobile communication terminal via a network.

The invention claimed is:

1. A method for playing interactive contents for standby mode in a mobile communication terminal, which can be used as a standby mode screen and provide interactive actions for a key input from a user, wherein the interactive contents include action information defining at least one manipulation key input to perform the interactive actions and at least one operation corresponding to the manipulation key input, and the interactive contents include a plurality of play regions, in each of which at least one corresponding action key input is defined in the action information, the method comprising the steps of:

(1) causing the mobile communication terminal to enter a standby mode;

(2) driving an interactive contents player for playing the interactive contents for standby mode;

(3) playing a first play region of first interactive contents set as the standby mode screen for the mobile communication terminal and displaying the played first play region on a display screen of the mobile communication terminal;

(4) waiting and receiving the manipulation key input defined in the action information for the first interactive contents; and (5) playing a play region corresponding to the corresponding action key input defined for the first interactive contents and displaying the played play region on the display screen of the mobile communication terminal when the received manipulation key input is the corresponding action key input, or otherwise obtaining a definition of an operation corresponding to the manipulation key input from the action information and performing the defined operation.

2. The method according to claim 1, further comprising the steps of:

(a) waiting and receiving an interactive mode switching key input defined to cause the mobile communication terminal to enter an interactive play mode for performing the interactive actions, between the steps (3) and (4); and (b) playing an interactive mode start region of the first interactive contents and displaying the played interactive mode start region on the display screen of the mobile communication terminal.

3. The method according to claim 2, wherein the interactive mode start region of the first interactive contents corresponds to one of the plurality of play regions of the first interactive contents.

4. The method according to claim 2, wherein the interactive mode start region of the first interactive contents is a unique play region exclusively for the first interactive contents independently of the plurality of play regions.

5. The method according to claim 1, wherein the at least one corresponding action key input is divided into at least one normal corresponding action key input and at least one termination corresponding action key input, and wherein the step (5) includes the steps of:

(5a) playing a play region corresponding to the corresponding action key input and displaying the played play region on the display screen of the mobile communication terminal when the received manipulation key input is the normal corresponding action key input defined for the first interactive contents, and then going into the step (3);

(5b) playing a play region corresponding to the corresponding action key input and displaying the played play region on the display screen of the mobile communication terminal when the received manipulation key input is the termination corresponding action key input defined for the first interactive contents, waiting and receiving a selection key input from a user, going into the step (3) when the received selection key input is a first value, and terminating the play of the first interactive contents when the received selection key input is a second value; and (5c) obtaining a definition of an operation corresponding to the manipulation key input from the action information and performing the operation when the received manipulation key input is not the corresponding action key input defined for the first interactive contents, and then going into the step (3).

6. The method according to claim 1, wherein the at least one corresponding action key input is divided into at least one normal corresponding action key input and at least one termination corresponding action key input, and wherein the step (5) includes the steps of:

(5a) classifying the received manipulation key input;

(5b) playing a play region corresponding to the corresponding action key input and displaying the played play region on the display screen of the mobile communication terminal when the received manipulation key input is the normal corresponding action key input defined for the first interactive contents, waiting the manipulation key input defined in the action information for the first interactive contents, going into the step (5a) when the manipulation key input is received, and proceeding to the third step when the manipulation key input is not received;

(5c) playing a play region corresponding to the corresponding action key input and displaying the played play region on the display screen of the mobile communication terminal when the received manipulation key input is the termination corresponding action key input defined for the first interactive contents, waiting and receiving a selection key input from a user, proceeding to the step (3) when the received selection key input is a first value, and terminating the play of the first interactive contents when the received selection key input is a second value; and (5d) obtaining a definition of an operation corresponding to the manipulation key input from the action information and performing the operation when the received manipulation key input is not the corresponding action key input defined for the first interactive contents and then proceeding to the step (3).

7. The method according to claim 1, wherein the action information defines at least one manipulation key input to cause the interactive contents player to perform the interactive action for a user in the interactive contents and an operation to be performed by the interactive contents player corresponding the manipulation key input, using a preset set of action commands.

8. A method for playing interactive contents for standby mode including a plurality of frames in a mobile communication terminal, which can be used as a standby mode screen and provide interactive actions for a key input from a user, wherein the interactive contents include rendering data to describe contents to be displayed on a display screen of the mobile communication terminal for each frame and action information to describe the interactive actions for the key input from the user, and the action information defines at least one manipulation key input to perform the interactive actions and an operation to be performed by the mobile communication terminal corresponding to the manipulation key input, the method comprising the steps of:

(1) causing the mobile communication terminal to enter a standby mode;

(2) driving an interactive contents player for playing the interactive contents for standby mode;

(3) playing a first play region of first interactive contents set as the standby mode screen for the mobile communication terminal and displaying the played first play region on the display screen of the mobile communication terminal;

(4) waiting and receiving an interactive mode switching key input defined to cause the mobile communication terminal to enter an interactive play mode for performing the interactive actions;

(5) playing an interactive mode start region of the first interactive contents and displaying the played interactive mode start region on the display screen of the mobile communication terminal;

(6) waiting and receiving the manipulation key input defined in the action information for the first interactive contents; and (7) obtaining a definition of an operation corresponding to the received manipulation key input from the action information and performing the defined operation.

9. The method according to claim 8, wherein the key input from the user is sent to a preset key input queue through a system program of the mobile communication terminal, and the interactive contents player receives the key input from the user by performing a reception operation for the key input queue.

10. The method according to claim 8, wherein the rendering data to describe the contents for each frame are configured according to a known SIS3 (Simple Image Service 3) data format.

11. The method according to claim 8, wherein the manipulation key input defined by the action information comprises a button selection key input defined as a button selection for the interactive contents and a non-button selection key input not defined as the button selection, and the operation defined by the action information comprises a button selection operation to be performed by the mobile communication terminal corresponding to the button selection key input and a non-button selection operation to be performed by the mobile communication terminal corresponding to the non-button selection key input, and wherein the step (7) comprises the steps of:

(7a) classifying the received manipulation key input;

(7b) obtaining the button selection corresponding to the manipulation key input when the received manipulation key input is the button selection key input, obtaining a definition of the button selection operation corresponding the button selection, and performing the defined button selection operation; and (7c) obtaining a definition of the non-button selection operation corresponding the manipulation key input when the received manipulation key input is the non-button selection key input, and performing the defined non-button selection operation, wherein the steps (7b) and (7c) are performed without order.

12. The method according to claim 8, wherein the action information includes local action information to describe the interactive actions for the key input from the user for each frame and global action information to describe the interactive actions for the key input from the user for the interactive contents, and the local action information defines at least one local manipulation key input to perform the interactive actions for each frame and a local operation to be performed by the mobile communication terminal corresponding to the local manipulation key input, and the global action information defines at least one global manipulation key input to perform the interactive actions for the interactive contents and a global operation to be performed by the mobile communication terminal corresponding to the global manipulation key input.

13. The method according to claim 12, wherein the local manipulation key input defined by the local action information comprises a local button selection key input defined as a button selection for frames corresponding to the local action information and a local non-button selection key input not defined as the button selection, and the local operation defined by the local action information comprises a local button selection operation to be performed by the mobile communication terminal corresponding to the local button selection key input and a local non-button selection operation to be performed by the mobile communication terminal corresponding to the local non-button selection key input, and wherein the step (7) comprises the steps of:

(7a) classifying the received manipulation key input;

(7b) obtaining the button selection corresponding to the manipulation key input when the received manipulation key input is the local button selection key input defined in the local action information corresponding to a frame provided with the manipulation key input, obtaining a definition of the local button selection operation corresponding the button selection, and performing the defined local button selection operation;

(7c) obtaining a definition of the local non-button selection operation corresponding the manipulation key input and performing the defined local non-button selection operation when the received manipulation key input is the local non-button selection key input defined in the local action information corresponding to a frame provided with the manipulation key input; and (7d) obtaining a definition of the global operation corresponding the manipulation key input and performing the defined global operation when the received manipulation key input is the global manipulation key input defined in the global action information of the first interactive contents, wherein the steps (7b), (7c) and (7d) are performed without order.

14. The method according to claim 1, wherein the action information in the interactive contents for standby mode includes an Internet manipulation key input corresponding to an Internet access to a specific Internet site and a URL information of the specific Internet site to be accessed according to the Internet manipulation key input, and when the mobile communication terminal is provided with the Internet manipulation key input from the user while playing the interactive contents for standby mode in the standby mode, the play of the interactive contents for standby mode is stopped and the Internet access to the specific Internet site is performed using the URL information.

15. A mobile communication terminal for playing interactive contents in a standby mode using an interactive contents play module and providing interactive actions for a key input from a user according to action information of the interactive contents, wherein the interactive contents play module comprises:

an interactive manager for processing interactive objects received from the mobile communication terminal;

a contents parser for parsing the interactive contents;

a graphic solution for generating an image to be displayed on a display screen of the mobile communication terminal based on the interactive contents parsed by the contents parser and the interactive objects processed by the interactive manager; and a player controller for controlling the interactive manager, the contents parser and the graphic solution and processing the key input from the user, and wherein the mobile communication terminal transmits the key input from the user to the player controller of the interactive contents play module when the key input from the user is provided while the interactive contents are played using the interactive contents play module, and the player controller receives the key input from the user and determines whether the key input from the user provides the interactive actions by referring to the action information of the interactive contents, and a definition of an operation to be performed by the mobile communication terminal corresponding to the key input is then obtained from the action information of the interactive contents and the defined operation is performed by the mobile communication terminal when it is determined that the key input from the user provides the interactive actions.

16. The mobile communication terminal according to claim 15, wherein the interactive contents play module is implemented as software on the mobile communication terminal, stored in a memory module in the mobile communication terminal and driven by a processor module in the mobile communication terminal.

17. The mobile communication terminal according to claim 15, wherein the interactive contents play module further includes a sound handler for processing a sound according to the interactive contents parsed by the contents parser.

18. The mobile communication terminal according to claim 15, wherein the interactive contents play module further includes a network handler for performing a wireless data communication according to the interactive contents parsed by said contents parser.

19. The mobile communication terminal according to claim 15, wherein the graphic solution includes a vector graphic solution for processing image data according to a vector graphic format, and a raster graphic solution for processing image data according to a raster graphic format.

20. A computer-readable information-recording medium in which a program for executing a method for playing interactive contents for standby mode in a mobile communication terminal, which can be used as a standby mode screen and provide interactive actions for a key input from a user, is recorded, wherein:

the interactive contents include action information defining at least one manipulation key input to perform the interactive actions and at least one operation corresponding to the manipulation key input; and the interactive contents also include a plurality of play regions, in each of which at least one corresponding action key input is defined in the action information, and wherein the method comprises the steps of:

(1) causing the mobile communication terminal to enter a standby mode;

(2) driving an interactive contents player for playing the interactive contents for standby mode;

(3) playing a first play region of first interactive contents set as the standby mode screen for the mobile communication terminal and displaying the played first play region on a display screen of the mobile communication terminal;

(4) waiting and receiving the manipulation key input defined in the action information for the first interactive contents; and (5) playing a play region corresponding to the corresponding action key input defined for the first interactive contents and displaying the played play region on the display screen of the mobile communication terminal when the received manipulation key input is the corresponding action key input, or otherwise obtaining a definition of an operation corresponding to the manipulation key input from the action information and performing the defined operation.

21. A computer-readable information-recording medium in which a program for executing a method for playing interactive contents for standby mode comprising a plurality of frames in a mobile communication terminal, which can be used as a standby mode screen and provide interactive actions for a key input from a user, is recorded, wherein:

the interactive contents include rendering data to describe contents to be displayed on a display screen of the mobile communication terminal for each frame and action information to describe the interactive actions for the key input from the user, and the action information defines at least one manipulation key input to perform the interactive actions and an operation to be performed by the mobile communication terminal corresponding to the manipulation key input, and wherein the method comprises the steps of:

(1) causing the mobile communication terminal to enter a standby mode;

(2) driving an interactive contents player for playing the interactive contents for standby mode;

(3) playing a first play region of first interactive contents set as the standby mode screen for the mobile communication terminal and displaying the played first play region on the display screen of the mobile communication terminal;

(4) waiting and receiving an interactive mode switching key input defined to cause the mobile communication terminal to enter an interactive play mode for performing the interactive actions;

(5) playing an interactive mode start region of the first interactive contents and displaying the played interactive mode start region on the display screen of the mobile communication terminal;

(6) waiting and receiving the manipulation key input defined in the action information for the first interactive contents; and (7) obtaining a definition of an operation corresponding to the received manipulation key input from the action information and performing the defined operation.

22. The method according to claim 8, wherein the action information in the interactive contents for standby mode includes an Internet manipulation key input corresponding to an Internet access to a specific Internet site and a URL information of the specific Internet site to be accessed according to the Internet manipulation key input, and when the mobile communication terminal is provided with the Internet manipulation key input from the user while playing the interactive contents for standby mode in the standby mode, the play of the interactive contents for standby mode is stopped and the Internet access to the specific Internet site is performed using the URL information.

* * * * *